(12) United States Patent
Shaffer et al.

(10) Patent No.: US 7,135,159 B2
(45) Date of Patent: Nov. 14, 2006

(54) SYNTHESIS OF NANOSCALED CARBON MATERIALS

(75) Inventors: Milo S P Shaffer, Cambridge (GB); Ian Kinloch, Cambridge (GB); Alan H Windle, Cambridge (GB)

(73) Assignee: Cambridge University Technical Services Limited, Cambridge (GB)

( * ) Notice: Subject to any disclaimer, the term of this patent is extended or adjusted under 35 U.S.C. 154(b) by 146 days.

(21) Appl. No.: 10/477,831

(22) PCT Filed: May 14, 2002

(86) PCT No.: PCT/GB02/02239

§ 371 (c)(1),
(2), (4) Date: Apr. 23, 2004

(87) PCT Pub. No.: WO02/092506

PCT Pub. Date: Nov. 21, 2002

(65) Prior Publication Data

US 2004/0234444 A1    Nov. 25, 2004

(30) Foreign Application Priority Data

May 15, 2001    (GB)    ................................. 0111875.1

(51) Int. Cl.
    *C01B 31/02*    (2006.01)
(52) U.S. Cl. .............................. 423/447.3; 423/445 B; 977/742; 977/843
(58) Field of Classification Search ............. 423/447.3; 502/325
    See application file for complete search history.

(56) References Cited

U.S. PATENT DOCUMENTS 5,102,647 A * 4/1992 Yamada et al. .......... 423/447.3
6,362,011 B1   3/2002 Massey et al.

FOREIGN PATENT DOCUMENTS

WO    WO 99/06618    7/1998
WO    WO 01/38219    11/2000

OTHER PUBLICATIONS

Andrews et al., "Continuous Production of Aligned Carbon Nanotubes: A Step Closer to Commercial Realization," *Chemical Physics Letters*, No. 303, Apr. 16, 1999, pp. 467-474.

Bower et al., "Nucleation and Growth of Carbon Nanotubes by Microwave Plasma Chemical Vapor Deposition," *Applied Physics Letters*, vol. 77, No. 17, Oct. 23, 2000, pp. 2767-2769.

Cui et al., "Deposition of Aligned Bamboo-Like Carbon Nanotubes Via Microwave Plasma Enhanced Chemical Vapor Deposition," *Journal of Applied Physics*, vol. 88, No. 10, Nov. 15, 2000, pp. 6072-6074.

Fan et al., "The Influence of Preparation Parameters on the Mass Production of Vapor-Grown Carbon Nanofibers," *Carbon*, vol. 38, 2000, pp. 789-795.

Merkulov et al., "Patterned Growth of Individual and Multiple Vertically Aligned Carbon Nanofibers," *Applied Physics Letters*, vol. 76, No. 24, Jun. 12, 2000, pp. 3555-3557.

Merkulov et al., "Scanned-Probe Field-Emission Studies of Vertically Aligned Carbon Nanofibers," *Journal of Applied Physics*, vol. 89, No. 3, Feb. 1, 2001, pp. 1933-1937.

Ren et al., "Synthesis of Large Arrays of Well-Aligned Carbon Nanotubes on Glass," *Science*, vol. 282, Nov. 6, 1998, pp. 1105-1107.

Satishkumar et al., Single-Walled Nanotubes by the Pyrolysis of Acetylene-Organometallic Mixtures, *Chemical Physics Letters*, vol. 293, Aug. 21, 1998, pp. 47-52.

* cited by examiner

*Primary Examiner*—Stuart Hendrickson
*Assistant Examiner*—Alvin T Raetzsch
(74) *Attorney, Agent, or Firm*—Pillsbury Winthrop Shaw Pittman LLP (57) ABSTRACT

A method for producing nanoscaled carbon materials comprising providing, dispersed in a carrier gas, finely divided substrate particles on which to nucleate a catalyst, providing in said carrier gas a catalyst precursor material, decomposing the catalyst precursor material to form a catalytic metal in the presence of the substrate particles such that the catalyst metal is deposited on said substrate particles to form supported-catalyst particles dispersed in said carrier gas, forming a mixture of said dispersed supported-catalyst particles and a gas comprising a carbon containing gas at a temperature at which said carbon containing gas will react to form carbon when in the presence of said supported-catalyst particles, forming nanoscaled carbon materials by said carbon forming reaction and recovering the nanoscaled carbon materials.

21 Claims, 5 Drawing Sheets

SYNTHESIS OF NANOSCALED CARBON MATERIALS

CROSS REFERENCE TO RELATED APPLICATIONS

This is the U.S. national stage of PCT/GB02/02239, filed May 14, 2002, which in turn claims priority to British patent application no. 0111875.1, filed May 15, 2001, both of which are incorporated herein in their entirety by reference.

The present invention relates to the synthesis of nanoscaled carbon materials, especially Fullerenic nano-structures such as single or multi-walled carbon nanotubes.

Such materials have been produced previously using various approaches including the laser or arc-discharge ablation of a carbon/catalyst mixture target.

For larger scale synthesis, the most promising methods have been based on chemical vapour decomposition (CVD). In these methods, a carbon containing gas is decomposed at high temperature under the influence of a finely divided transition metal catalyst.

The catalyst may be in the form of a fragmented surface layer on a porous or non-porous macroscopic substrate (Ren et al, Bower et al, V I Merkulov, D H Lowndes, Y Y Wei et al, Andrews et al, and Cui et al,). As described in Kanzow et al, the catalyst may be a laser ablated nickel target exposed to a flow of reactant gas.

Alternatively, the catalyst may be in finely divided form. In WO00/17102, the catalyst is constituted by nanometer sized metal particles supported on larger (10–20 nm) alumina particles. The particles are placed in the centre of a furnace and the carbon containing gas is passed over them.

In WO00/73205, catalyst particles comprising two different metals supported on silica, alumina, magnesia, zirconia or zeolite are used, again placed in a tube within a furnace. It is also suggested that the metallic catalytic particles may be continuously fed to the furnace.

In WO00/26138, catalyst nanoparticles are continuously produced within a furnace in the presence of reactant gas by decomposing a gaseous catalyst precursor (normally $Fe(CO)_5$) in the presence of a 'nucleation agency'. This may be a laser which provides some or all of the energy needed for photolysis of the catalyst precursor, or it may be a precursor moiety that stimulates clustering of catalyst atoms by decomposing more rapidly or binding to itself more strongly after dissociation. Typically, this is $Ni(CO)_4$.

In our view it is doubtful whether the mechanism of Fe catalyst cluster nucleation by Ni atoms described there is responsible for the improved nanotube production described. The Ni may be acting as a co-catalyst, as the formation of carbon nanotubes using Ni as a catalyst is well known. Rather than being a well-defined substrate on which Fe atoms deposit in clusters, the Ni and Fe are essentially co-condensing. The formation of a solid solution of the metals would be expected.

A continuing problem in this art is the control over the extent of the production of multi-walled nanotubes in preference to single walled nanotubes and the control of the diameter of the tubes. In CVD synthesis, fine structures, such as single walled nanotubes require very fine catalyst particles with diameters similar to that of the synthesised material (typically about 1 nm). Maintaining the required catalyst particle size generally requires the use of a substrate to act as a carrier material to stabilise the catalyst itself. However, the production of very fine supported catalyst particles prior to use in the nanotube synthesis is generally complex and expensive involving for example aggressive reagents and supercritical drying. Substantial problems arise in preventing nanoparticles from coalescing prematurely and the synthesis of such particles is not suitable for scaled-up production.

The production of catalyst particles in situ in the reaction zone as in WO00/26138, where the catalyst particles are essentially unsupported, or where the nucleation of catalyst clusters is enhanced by the presence of Ni species suffers from a lack of particle size control. Since the particles are growing, the time at which they initiate nanotube growth may be critical.

Because the nucleation sites are formed in situ from individual Ni atoms and comprise only a few atoms (2 to 5 atoms) in total, the process offers little control over the size of the nucleating "particle", or of the size of the final catalyst clusters. There is no controlled templating of the catalyst by the structure of the substrate.

Accordingly, the present invention provides in a first aspect a method for producing nanoscaled carbon materials comprising providing, dispersed in a carrier gas, finely divided substrate particles on which to nucleate a catalyst, providing in said carrier gas a catalyst precursor material, decomposing the catalyst precursor material to form a catalytic metal in the presence of the substrate particles such that the catalyst metal is deposited on said substrate particles to form supported-catalyst particles dispersed in said carrier gas, forming a mixture of said dispersed supported-catalyst particles and a gas comprising a carbon containing gas at a temperature at which said carbon containing gas will react to form carbon when in the presence of said supported-catalyst particles, forming nanoscaled carbon materials by said carbon forming reaction and recovering the nanoscaled carbon materials.

The carrier gas is preferably the gas comprising the carbon containing gas. A stream of reactant gas can have the catalyst precursor and the substrate particles injected into it at or upstream of a reaction zone, and the supported catalyst can be formed in situ in the reactant gas, which therefore acts as the carrier gas referred to. Alternatively, the carrier gas containing the dispersed supported-catalyst particles is mixed with a gas comprising said carbon containing gas immediately following the formation of the supported-catalyst particles. In this method, the supported catalyst particles are formed by decomposing the catalyst precursor material in the presence of the substrate particles in a carrier gas (suitably an inert gas under the conditions) and the supported catalyst particles so formed carried within the carrier gas are then mixed into a reactant gas. The zones in which the supported-catalyst particles are formed and in which the nanotube forming reaction takes place are then separate.

Suitable carbon-containing compounds for use as the gaseous reactant include carbon monoxide and hydrocarbons, including aromatic hydrocarbons, e.g., benzene, toluene, xylene, cumene, ethylbenzene, naphthalene, phenanthrene, anthracene or mixtures thereof, non-aromatic hydrocarbons, e.g., methane, ethane, propane, ethylene, propylene, acetylene or mixtures thereof and oxygen-containing hydrocarbons, e.g., formaldehyde, acetaldehyde, acetone, methanol, ethanol or mixtures thereof. In preferred embodiments, the carbon-containing compound is carbon monoxide (CO) or methane or ethylene or acetylene. It is of course only required that the reactant be gaseous under the reaction conditions.

The reactant gas may be mixed with other gas or gases acting as a diluent such as inert gases, e.g. argon. It may also be mixed with non carbon containing gases that play no direct role in the nanotube forming reaction but which play a contributory role, for instance by reacting with amorphous carbon as it is formed (as a by-product) and so keeping the reaction sites on the catalyst clean and available for nanotube formation.

Gases which may be mixed with the carbon containing gas include argon, hydrogen, nitrogen, ammonia, or helium.

The gaseous effluent from the reaction zone may be recycled, with or without clean up.

The catalyst is suitably a transition metal. Particularly the Group VIB chromium (Cr), molybdenum (Mo), tungsten (W) or Group VIIIB transition metals, e. g., iron (Fe), cobalt (Co), nickel (Ni), ruthenium (Ru), rhodium (Rh), palladium (Pd), osmium (Os), iridium (Ir) and platinum (Pt) or mixtures thereof. Metals from the lanthanide and actinide series may also be used. Preferred are Fe, Ni, Co, Mo and mixtures thereof such as a 50/50 mixture (by weight) of Ni and Co, or a mixture of Fe and Ni, or a mixture of Fe and Mo. Any of these transition metals individually or in combination with any of the other transition metals listed may be used in clusters to serve as a catalyst for carbon nanotube growth. Particularly preferred catalysts are mixtures of two or more of the listed metals.

The transition metal clusters may have a size from about 0.5 nm to over 30 nm. Clusters in the range of 0.5 to 3 nm will produce singlewall nanotubes, while larger clusters tend to produce multiwall nanotubes with outer diameters greater than about 3 nm. Generally, using the process of this invention, catalytic production of nanotubes will be predominantly singlewall nanotubes.

The precursor is preferably a heat or light or plasma decomposable compound of one or more metals listed above, such as a carbonyl or cyclopentadienyl organometallic compound.

Preferably, under the reaction conditions, the catalyst precursor is gaseous prior to decomposition. Solid or liquid (at room temperature) catalyst precursors may be pre-heated to produce volatilisation prior to introduction into the presence of the substrate material. Alternatively, solid or liquid catalyst precursor may be directly fed to the reaction zone together with or separately from the substrate material and without pre-heating.

Solid or liquid catalyst precursors and solid or liquid substrate materials may be entrained into gas flows for conveying to the reaction zone by known methods. These include the use of a solution of each in each other or in a solvent (which may be the carbon source for the nanoparticle production, e.g. a hydrocarbon) or sublimation.

Suitably, formation of the nanoscale carbon materials takes place at a temperature of from 650° C. to 1250° C., e.g. 850° to 1100° C.

The substrate particles are conveyed from a supply of substrate material and are mixed with the catalyst precursor material either before or after the catalyst precursor material reaches the zone in which decomposition occurs.

The substrate may be by-way of example silica, alumina or a POSS (polyhedral oligomeric silsesquioxanes or polyhedral oligomeric silicates). Some of these materials are liquid at room temperature. Generally a single POSS molecule will constitute a particle of substrate for nanotube growth. In the most straightforward case, the substrate particles are simply finely ground powders, such as silica or alumina. Finer material may be generated by a range of methods, known to those skilled in the art, such as colloidal processing, spray-drying, hydrothermal processing and so on. Particular benefit for the production of nanotubes may be derived by using structured substrate particles, particularly mesoporous silicas, anodised alumina membranes, or zeolites. These materials have channels of similar dimensions to nanotubes, and can further guide both the deposition of catalyst and synthesis of nanotubes. A particularly preferred approach, is to use, so-called POSS (polyhedral oligomeric silsesquioxane) compounds, as the catalyst-substrate particles. In this case the distinction between catalyst and substrate is rather blurred, as POSS compounds are themselves molecular silica-based materials. A POSS molecule can act as a site for catalyst formation in situ or, as described below in connection with a second aspect of the invention, in a pre-reaction step. An attractive option is to functionalise POSS itself with metallic functionalities—creating a catalyst-substrate in a single molecule (strong substrate-catalyst interactions have been shown to favour single-wall nanotube production).

The advantages of using a POSS are numerous. They have a very high surface area. Their diameters are around 1 nm (the same size as single wall nanotubes) but are tuneable as different POSS molecules have different sizes. They can be monodisperse (have specific molecular weights) and hence have the potential to generate well defined products. As they have molecular character, they may be liquid or may be dissolved in a suitable liquid carrier (and may potentially even be evaporated directly) for injection into the furnace. They have excellent thermal stability in themselves. They have the potential to form well-defined derivatives that potentially add catalytic metal particles (for example iron).

The finely divided substrate particles preferably have a size not smaller than 1 nm, e.g. not less than 5 nm. They may contain not less than 10 atoms, e.g. not less than 15 to 20 atoms, perhaps not less than 50 atoms or 75 atoms. The substrate is fed to the zone in which the catalyst precursor material is decomposed and preferably is essentially unchanged in the step of supported-catalyst particles, except for the deposition thereon of the catalyst material. However, some chemical modification of the substrate particles during the formation of the supported-catalyst particles is permissible, e.g. the removal of surface chemical groups or solvating chemical side chains. Preferably, the size of the substrate particles remains substantially unchanged.

The presence of the substrate particles during the decomposition of the catalyst precursor material serves to lower the nucleation energy of the catalyst atoms and to control the size and shape of the catalyst cluster so formed.

To stimulate decomposition of the catalyst precursor material, an additional energy source (over and above the temperature of the decomposition zone) may be locally applied. Such a source is preferably a laser beam which may be directed into the catalyst precursor material in the presence of the dispersed substrate particles, but may be a plasma discharge or an arc discharge formed in the presence of the catalyst precursor material and the dispersed substrate particles. A pulsed or CW laser may be used, e.g. a KrF eximer laser or a Nd:YAG laser.

Preferred gas pressures are from 0.1 to 50 bar A, preferably from 0.5 to 5 bar A, more preferably 1 to 2 bar A. The ratio of catalyst metal to carbon fed to the reaction zone is preferably less than 1:100, e.g. 1:100 to 1:500.

In a second, independent aspect, the present invention provides method for producing nanoscaled carbon materials comprising providing, dispersed in a reactant gas, finely divided supported-catalyst particles comprising catalyst atoms carried by substrate particles, wherein said reactant gas comprises a carbon containing gas at a temperature at which said carbon containing gas will react to form carbon when in the presence of said supported-catalyst particles and said substrate particles are POSS, forming nanoscaled carbon materials by said carbon forming reaction and recovering the nanoscaled carbon materials.

Whilst the supported-catalyst particles may be produced in situ in accordance with the first aspect of the invention, they may also be pre-prepared by unrelated methods. For instance, the POSS used may be a metallo-organic-silica compound in which the catalyst metal is part of the POSS molecule, rather than being deposited thereon.

All of the advantages of using POSS mentioned previously apply in this aspect of the invention also.

The methods described herein according to either aspect of the invention may be optimised for the production either of single or multiwalled carbon nanotubes.

A number of process parameters may be adjusted with a view to increasing the yield of single-walled nanotubes. Previous practice has typically been to inject catalyst precursors into the reactant gas no later than at an upstream end of a reaction furnace, so that there is a gradual rise in the temperature of both the reactant gas and the catalyst. To minimise the size of catalyst clusters and so to favour the production of small diameter materials, it is preferable to inject the catalyst precursor as rapidly as possible into a hot region of the furnace, where the reactant gas has already reached reaction temperature.

A preferred option is to introduce the precursor from an inlet in the side wall of the main stream, so, ideally, the precursor nozzle is fashioned to turn the injection flow parallel to the main feedstock flow, either downstream or upstream. The latter option can be advantageous with regard to turbulent mixing, as discussed further below. The injected precursor may contain some reactant gas or other gas as carrier.

It is preferred that the precursor mix is dilute. An inert carrier can be used to separate the precursor molecules or droplets from each other. The greater the separation the slower the condensation of larger metal clusters. A precursor vapour is preferable to liquid as the concentration is lower. If droplets of precursor liquid are introduced they should be as small as possible (i.e. an aerosol) and the liquid may be diluted with a suitable diluent, which may be a hydrocarbon source in itself.

The precursor stream should be mixed and diluted with the carbon feedstock as rapidly as possible. High speed mixing can be achieved using turbulent flows and particularly the use of an expansion nozzle for either the feedstock or the precursor. Preferably, the precursor is expanded since the resulting temperature reduction suppresses metal cluster formation until mixing and dilution are further advanced.

The use of a high thermal stability precursor minimises premature decomposition and cluster formation.

Excessively stable catalyst precursors can be a disadvantage since the position of the metal catalyst formation will vary along the length of the furnace (since it will take a significant time after injection). The situation can be remedied by using a secondary energy source such as a laser as described above.

In a third aspect, the present invention relates to a method for producing nanoscaled carbon materials comprising forming a mixture in a carrier gas of a finely divided solid, a heat-decomposable metal complex, and a carbon containing gas, heating the mixture and collecting the nanoscaled carbon materials formed.

In a fourth aspect, the present invention relates to a method for producing nanoscaled carbon materials comprising forming a mixture in a carrier gas of a POSS, a metal carbonyl or cyclopentadiene compound, and a carbon containing gas, heating the mixture and collecting the nanoscaled carbon materials formed.

The invention will be further illustrated by the following examples, as illustrated in the accompanying drawings, in which.

The examples were carried out at just above ambient pressure. Pressure was maintained by the use of a silicon oil bubbler.

EXAMPLE 1

A vertical furnace containing a silica tube (internal diameter 65 mm, length 90 cm) can be used to synthesis nanotubes. The tube is sealed at both ends by metal fittings (water-cooled where necessary) with suitable access ports for gas, and solid substrates and products. Two streams of dry, filtered, hydrogen are passed through the furnace from the top downwards, one is bubbled through a solution of toluene saturated with ferrocene. The flow rates in the two streams are around 300 cc/min (bubbled) and 700 cc/min (pure). Finely ground silica or POSS powder is held in a gas-tight hopper at the top of the furnace and is fed into the furnace tube at a constant rate by means of a screw feed (at around 0.5 g/hr). The furnace is heated to 705° C. The powder falls through the furnace where it first collects catalyst particles which then allow the formation of nanotubes. The product is collected at the bottom of the furnace, and the exhaust gas is cleaned for disposal or recycling.

Various modifications of the illustrated method are possible. The silica may be supplied as described above, but the hydrogen stream carrying the toluene and ferrocene may be injected through a side arm of the main furnace tube, directly into the hot zone.

Alternatively, the hydrogen gas streams may be supplied from the bottom of the furnace, to supply a counter current supporting the silica particles, and hence increasing their residence time in the furnace.

Alternatively, when using POSS-based material, the hopper may not be employed. Instead the POSS material (e.g. dodecaphenyl-POSS) is dissolved in the toluene carrier along with the ferrocene.

EXAMPLE 2

Figure 1:
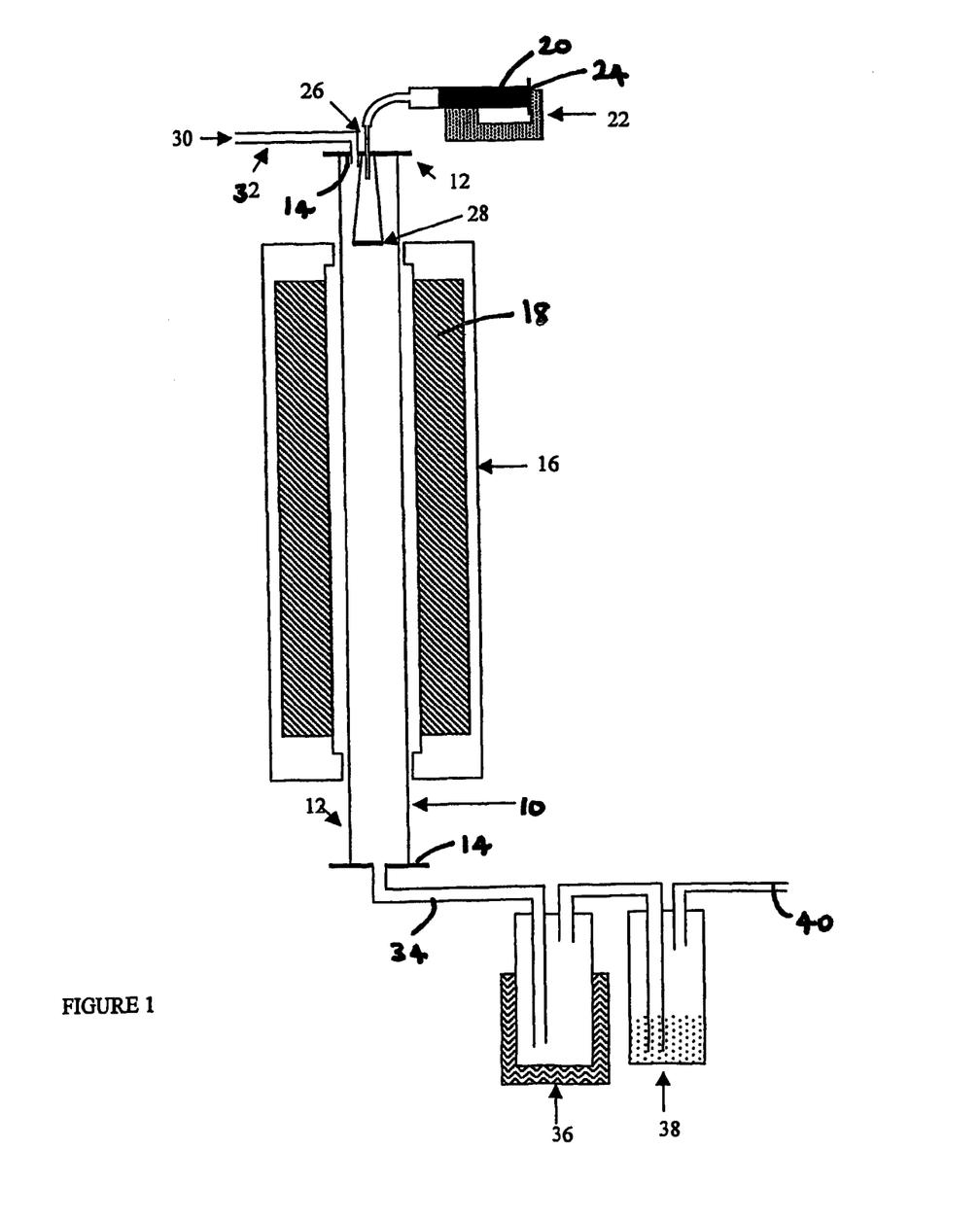
FIG. 1 shows the apparatus used in Example 2.

As shown in FIG. 1, a vertical quartz reaction tube 10 (1.4 m long, 0.065 m internal diameter) having ends 12 sealed with plates 14 cooled by an electric fan (not shown) was placed inside a clam furnace 16 having a 0.9 m long hot zone 18 heated to 800° C. A syringe 20 controlled by a syringe pump 22 was used to introduce a solution 24 of 4 wt % ferrocene and 1.12 wt % dodecaphenyl POSS in toluene into the upper end 12 of the quartz tube 10 via a steel needle 26. The fall of the solution 24 was impeded by a horizontal metal plate 28 suspended above the hot zone 18 such that it was at a temperature of 425° C. The plate 28 was used to aid sublimation of the solution 24. Argon 30 was passed into the upper end 12 of the quartz tube 10 via an inlet pipe 32 at a flow rate controlled by a flowmeter (not shown) of 0.2 l/min.

Figure 2:
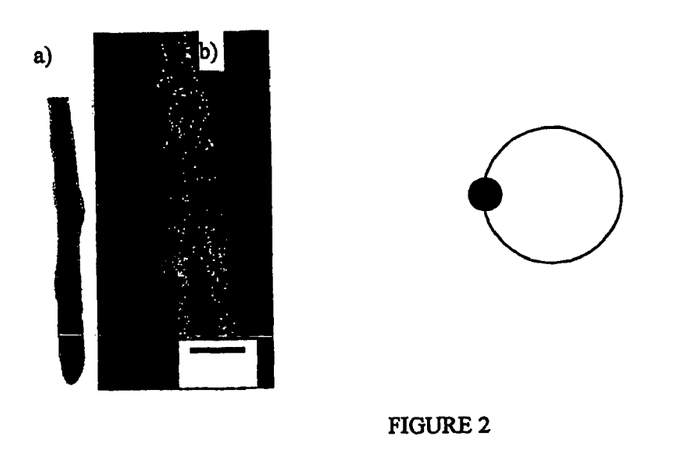
FIG. 2 shows the products obtained in Example 2,
a) bright field image
b) dark field image with position of the objective aperture on the 002 diffraction ring indicated.

The reaction products (not shown) passed through the lower end 12 of the quartz tube 10 via a pipe 34 into an ice-cooled flask 36 then through a silicone oil bubbler 38. The reaction products (not shown) were collected from the exhaust 40. The reaction was run for 20 minutes. The product was found to consist of a mixture of aggregates and nanofibres, with the latter forming an estimated 5% of the product. The nanofibres were solid, with no hollow and ranged in diameter from approximately 60 to 200 nm (FIG. 2). Dark field imaging demonstrated that the nanofibres were graphitic and at the edges there was some preferential orientation of the graphite planes parallel to the long axis of the nanofibres (FIG. 2). There were also small crystals embedded in the fibres.

EXAMPLE 3

Figure 3:
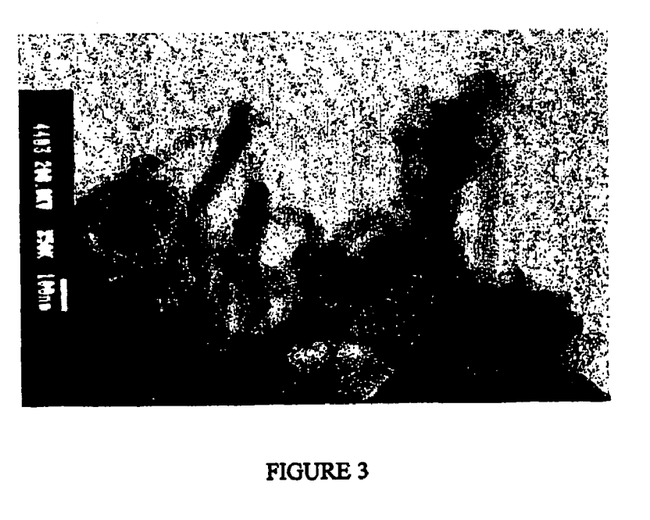
FIG. 3 shows the products obtained in Example 3.

The apparatus described in Example 2 was used with the metal plate 28 being replaced by a ceramic crucible (not shown) and a flow rate of 2.5 l/min of argon being used. The solution 24 was injected at a rate of 10 ml/hour. The solution 24 was sublimed from the crucible (not shown) and swept into the furnace 16. The reaction was run for 20 minutes and material was collected from a quartz substrate (not shown) at the end of the hot zone 18. The product was found to consist of approximately 50% multi-walled nanotubes and 50% nanosized particles (FIG. 3).

EXAMPLE 4

Figure 4:
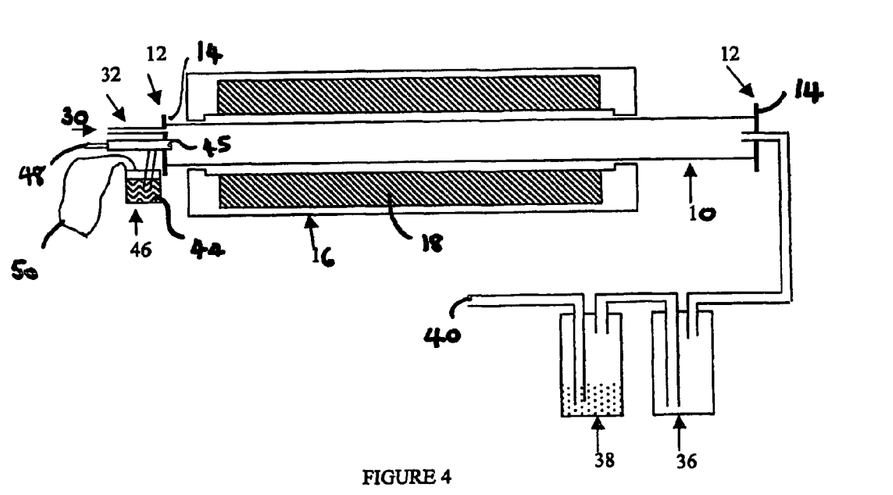
FIG. 4 shows the apparatus used in Example 4.
Figure 5:
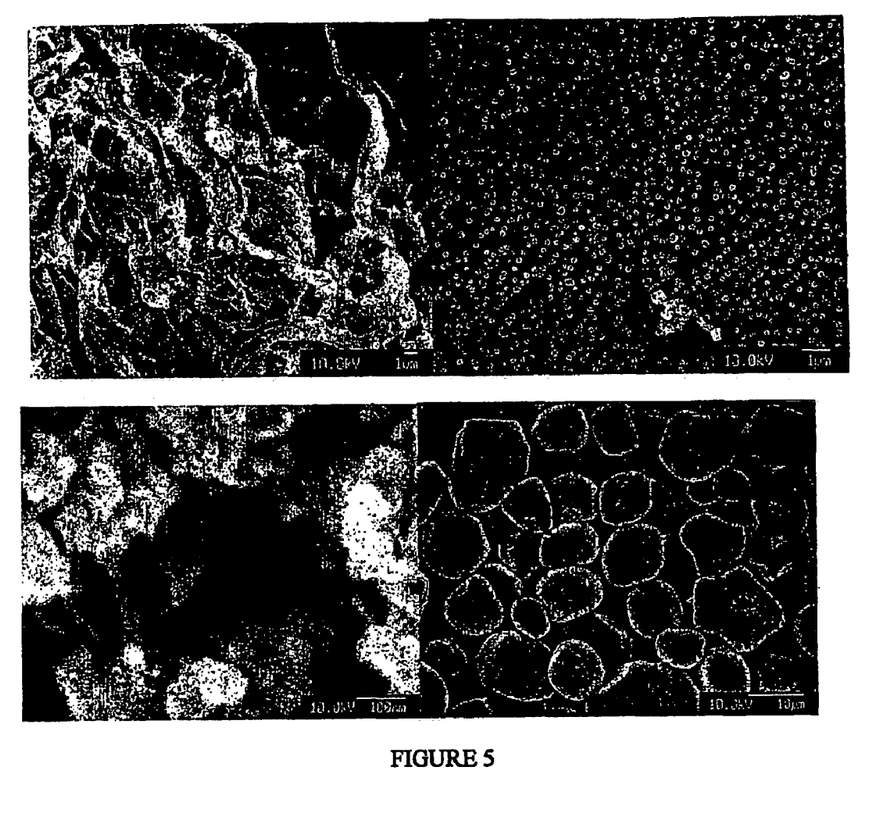
FIG. 5 shows the products obtained in Example 4.

As shown in FIG. 4, a horizontal quartz reaction tube 10 (1.4 m long, 0.065 m internal diameter) having ends 12 sealed with plates 14 cooled by an electric fan (not shown) was placed inside a clam furnace 16 having a 0.9 m long hot zone 18 heated to 760° C. Argon 30 was passed through the quartz tube via an inlet pipe 32 at a rate of 0.2 l/min measured at 25° C. A solution 44 of 1 wt % ferrocene and 8.3 wt % dodecaphenyl POSS in toluene was dispersed as an aerosol 45 from a reservoir 46 into the inlet end 12 of the quartz tube 10 using argon 48 at a rate of 4.5 l/min. The reservoir 46 was attached to an argon-filled bag 50. The solution 44 was introduced at a rate of 5 g/minute. The aerosol 45 was placed 0.12 m from the front of the furnace 16. The reaction was run for 2 minutes and the products (not shown) were passed through a flask 36 and a silicone oil bubbler 38 before being collected from the exhaust 40. The products were found to include solid fibres between approximately 15 and 180 nm in diameter and spheres (FIG. 5). The diameter of the spheres ranged from 100 nm to microns.

EXAMPLE 5

Figure 6:
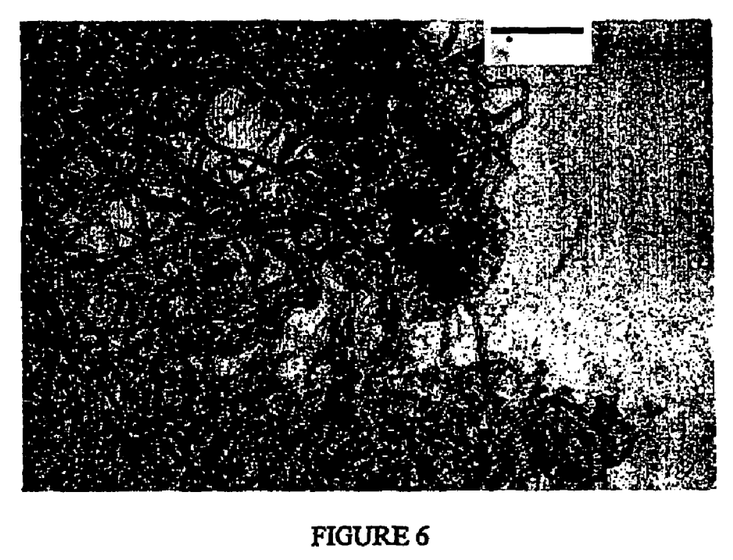
FIG. 6 shows the products obtained in Example 5.

The apparatus described in Example 4 was used, with the aerosol 45 replaced by a direct injection system (not shown) consisting of a syringe (not shown) driven by a syringe pump (not shown). Argon 30 was passed through the quartz tube 10 at a rate of 0.4 l/min measured at 25° C. A solution (not shown) of 1 wt % ferrocene and 2 wt % dodecaphenyl POSS in toluene was injected into the furnace 16. A size 30G needle (not shown) was used so that the solution (not shown) entered the furnace 16 as a steady stream (not shown). The reaction was run for 4 minutes and the products (not shown) were collected from the back of the quartz tube 10. It was found that multi-walled nanotubes were formed with diameters of approximately 20 nm (FIG. 6). These nanotubes had a carbon coating on their outsides.

It will be appreciated that many modifications and variations of the invention as described herein with reference to preferred embodiments thereof may be made within the broad scope of the invention.

1. V I Merkulov, D H Lowndes, L R Baylor, Jnl App Phys, 89, No 3, 1 Feb. 2000, 1933–1937
2. Z F Ren, Z P Huang, J W ZhXu, J H Wang, P Bush, M P Siegal and P N Provencio, Science 282 1105 (1998)
3. C Bower, O Zhou, W Zhu, D J Werder and S Jin, App Phys Lett 77 2767 2000.
4. V I Merkulov, D H Lowndes, Y Y Wei, G Eres and E Voelkl, App Phys Lett 76 3555 (2000)
5. R Andrews , D Jacques , A M Rao , F Derbyshire , D Qian, X Fan, E C Dickey and J Chen, Chem Phys Letts 303 467 (1999)
6. H Cui, O Zhou and B R Stoner, J App Phys 88 6072 (2000) H Kanzow, A Schmalz and A Ding, Chem Phys Lett 295 (1988) 525–530

The invention claimed is:

1. A method for producing nimoscaled carbon materials, the method comprising:
    a) providing, dispersed in a carrier gas, finely divided substrate particles on which to nucleate a catalyst;
    b) providing a catalyst precursor material in said carrier gas;
    c) decomposing the catalyst precursor material to form a catalytic metal in the presence of the substrate particles, wherein the catalyst metal is deposited on said substrate particles to form supported-catalyst particles dispersed in said carrier gas;
    d) forming a mixuure of dispersed supported-catalyst particles and a gas comprising a carbon containing gas at a temperature at which said carbon containing gas will react to form carbon when in the presence of said supported-catalyst particles;
    e) forming nanoscaled carbon materials by said carbon forming reaction; and
    f) recovering the nanoscaled carbon materials.

2. A method as claimed in claim 1, wherein said carrier gas is the gas comprising the carbon containing gas.

3. A method as claimed in claim 1, wherein the carrier gas containing the dispersed supported-catalyst particles is mixed with a gas comprising said carbon containing gas immediately following the formation of the supported-catalyst particles.

4. A method as claimed in claim 1, wherein the carbon containing gas is selected from carbon monoxide, an oxygen containing organic gas, and a hydrocarbon.

5. A method as claimed in claim 4, wherein the carbon containing gas is selected from carbon monoxide, benzene, toluene, xylene, cumene, ethylbenzene, naphthalene, phenanthrene, anthracene, methane, ethane, propane, ethylene, propylene, acetylene, formaldehyde, acetaldehyde, acetone, methanol, ethanol, and mixtures thereof.

6. A method as claimed in claim 1, wherein the catalyst precursor is a transition metal compound.

7. A method as claimed in claim 6, wherein the catalyst precursor is selected from an iron compound, a cobalt compound, a molybdenum compound, a nickel compound, a mixture of two or more thereof, and a compound containing two or more metals.

8. A method as claimed in claim 1, wherein the catalyst precursor is a metal carbonyl or a metal cyclopentadiene compound.

9. A method as claimed in claim 1, wherein the catalyst precursor is gaseous prior to the decomposition thereof.

10. A method as claimed in claim 1, wherein the formation of the nanoscale carbon materials takes place at a temperature of from 650° C. to 125° C.

11. A method as claimed in claim 1, wherein the substrate is selected from silica, alumina, and a POSS.

12. A method as claimed in claim 1, wherein the finely divided substrate particles have a size not smaller than 1mm.

13. A method as claimed in claim 1, wherein to stimulate decomposition of the catalyst precursor material, a laser bean is directed into the catalyst precursor material in the presence of the dispersed substrate particles.

14. A method as claimed in claim 1, wherein to stimulate decomposition of the catalyst precursor material, a plasma discharge or an arc discharge is formed in the presence of the catalyst precursor material and the dispersed substrate particles.

15. A method as claimed in claim 1, wherein said nanoscaled carbon materials are single or multiwalled carbon nanotubes.

16. A method for producing nanoscaled carbon materials comprising providing, dispersed in a reactant gas, finely divided supported-catalyst particles comprising catalyst atoms carried by substrate particles, wherein said reactant gas comprises a carbon containing gas at a temperature at which said carbon containing gas will react to form carbon when in the presence of said supported-catalyst particles and said substrate particles are POSS, forming nanoscaled carbon materials by said carbon forming reaction and recovering the nanoscaled carbon materials.

17. A method as claimed in claim 16, wherein the catalyst atoms are bonded to the POSS particles at defined locations.

18. A method for producing nanoscaled carbon materials comprising forming a mixture in a carrier gas of a finely divided solid, a heat-decomposable metal complex, and a carbon containing gas, heating the mixture and collecting the nanoscaled carbon materials formed, wherein the nanoscaled carbon materials have a diameter ranging from approximately 15 to 200 nm.

19. A method for producing nanoscaled carbon materials comprising forming a mixture in a carrier gas of a POSS, a metal carbonyl or cyclopentadiene compound, and a carbon containing gas, heating the mixture and collecting the nanoscaled carbon material formed.

20. The method of claim 18, wherein the diameter of the nanoscaled carbon materials ranges from approximately 15 to 180 nm.

21. The method of claim 18, wherein the diameter of the nanoscaled carbon materials ranges from approximately 60 to 200 nm.

* * * * *